No. 792,303. Patented June 13, 1905.

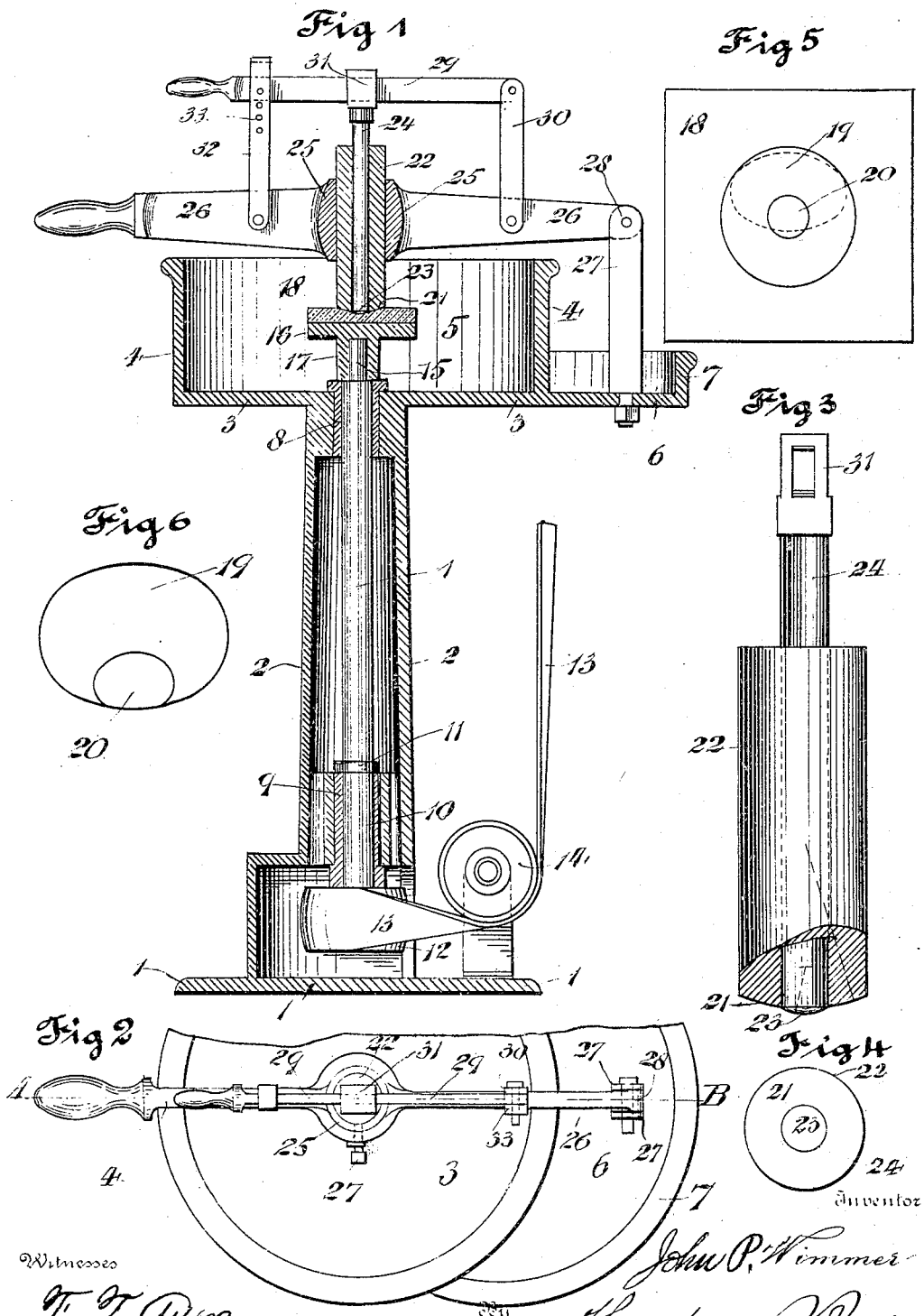

UNITED STATES PATENT OFFICE.

JOHN P. WIMMER, OF INDIANAPOLIS, INDIANA.

BIFOCAL-LENS-GRINDING TOOL.

SPECIFICATION forming part of Letters Patent No. 792,303, dated June 13, 1905.

Application filed January 3, 1905. Serial No. 239,409.

*To all whom it may concern:*

Be it known that I, JOHN P. WIMMER, a citizen of the United States, residing at Indianapolis, in the county of Marion and State of Indiana, have invented certain new and useful Improvements in Bifocal-Lens-Grinding Tools, of which the following is a specification, reference being had therein to the accompanying drawings.

This invention relates to mechanism for forming lenses from crown-glass or other suitable transparent medium, and is particularly adapted for use in connection with the construction of that class of lenses employed in spectacles and eyeglasses, and is particularly adapted for the special purpose of forming what is known to the optician as "bifocal lenses"—*i. e.*, having two independent foci located adjacent to each other, each of which focal points is located in one of the two fields into which the principal lens is divided, which fields are respectively ground to such configuration that the refractive powers of the respective lenses are of different strengths or powers.

The main object of this invention is to grind this type of a lens truly and accurately from a single piece or slab of glass or other suitable transparent medium at one setting in the machine; also, to provide a tool that will truly and accurately form the medium into said configurations, so as to conform with the required form of bifocal lens, and by means of which tool for forming bifocal lenses the border-line or line of juncture of the minor lens with that of the major lens fades the one into the other in such a manner as to render the line of union of said lenses invisible.

With this object in view I have constructed a mechanism illustrated in the accompanying drawings, in which similar numerals of reference designate like parts throughout the several views.

Figure 1 is a sectional elevational view of a grinding-machine, showing my grinding-tool applied thereto. Fig. 2 is a broken plan view of the same. Fig. 3 is a detail view of my grinding-tool. Fig. 4 is an end view of the same. Fig. 5 shows a view of a slab of glass after having undergone the process of grinding and showing in dotted lines the manner of cutting the bifocal lens therefrom, and Fig. 6 shows a finished bifocal lens.

Integral on the base-plate 1 is formed the hollow standard 2, on the top end of which is formed the table 3, around the edge of which is the vertically-extending annular wall 4, which forms a receptacle 5 for holding the emery to be used in connection with the grinding of the lenses and also serves as a reservoir for receiving the loose emery as it is thrown from the revoluble table 16 by reason of its centrifugal force. The table 3 is provided with the rearwardly-projecting portion 6, which extends to the rear of the receptacle 5, and is also provided with an upwardly-extending wall 7.

An upper bearing or bushing 8 and a lower bearing or bushing 9 are secured in the top and bottom portions of the standard 2, in which the vertically-extending revoluble shaft 10 is adapted to rotate and is held in vertical position therein by means of the retaining-collar 11, formed and situated on the lower end portion of said shaft to contact with the top end of the bushing 9. On the lower end of the revoluble shaft 10 is secured the driving-pulley 12, which latter is driven by a power-driven belt 13, which is guided and directed toward and to the drive-pulley 12 by means of the guide-pulleys 14, one of which is only shown in Fig. 1.

On the top reduced end 15, of the revoluble shaft 10, is removably secured thereon the revoluble table 16. The reduced end 15 of the revoluble shaft 10 is preferably threaded to be screwed into the threaded bore of the boss 17, formed centrally and integral on the under side of the revoluble table 16. On the top surface of the said table 16, which is preferably circular or disk form, is secured by cement or other suitable adhesive material or suitable means the glass or transparent medium 18 to be ground to the conformations, respectively, of the bifocal lens and form said bifocal lens in one single integral piece, as shown particularly in Figs. 5 and 6, in which 19 designates the major lens and 20 the minor lens of the bifocal, which latter is inclosed within the boundary of the major lens.

It will be observed on referring particularly to Fig. 5 that the initial formation of the bifocal lenses is such that the axes of the lenses are concentric, while the foci of the respective lenses are independent of each other. The conformation 19 is formed by and is dependent on the curvature 21 of the end grinding-surface of the primary tool 22, and the conformation of the lens 20 is similarly dependent on the curvature 23 of the bottom end of the secondary lens-grinding tool or mandrel 24, and the curves of said primary and secondary tools are varied to produce the required conformations of lenses. The primary lens-grinding tool or mandrel 22 is mounted in the central boss portion 25 of the lever 26 and is removably held therein by a set-screw 27. The primary lens-grinding tool or mandrel 22 is provided with a central bore adapted to receive the secondary lens-grinding tool or mandrel 24, which latter accurately fits in said bore and is adapted to slide longitudinally therein.

The lever 26 is hinged on the upright 27, secured to the rearwardly-projecting portion 6 of the table 3, which upright 27 has its top hinged end portion 28, whereto the lever 26 is hinged, elevated to an extent to permit the lever 26 to operate clear of the vertically-extending annular walls 4 of the table 3.

The operating-lever 29 has its hinged end hinged to the top end of the lever-supporting links 30, which links have their lower ends hinged to the lever 26 at a point intermediate the hinge end 28 and the boss portion 25 thereof. On the top end of the secondary lens-grinding tool or mandrel 24 is secured a slotted cross-head 31, the slot of which is adapted to receive the lever 29, and on the handle end of said lever 29 is the guide-strap 32, which is looped over the lever 29 at or near the handle of the handle end thereof, and said guide-strap has its bottom end secured to the lever 26 is position intermediate the handle and the boss 25 thereof. A series of holes 33 are formed in the strap 32 at equal intervals apart in vertical alinement, and said holes are provided for the purpose of receiving a retaining-pin which is designed to support the end of the lever 29, so that the secondary tool or mandrel 24 will be maintained in any desired position relatively to the primary tool or mandrel 22.

The practice of this invention is as follows: The glass to be ground is first cemented to the revoluble table 16, which table 16, being mounted on the end of the shaft 10, revolves with the latter, which is driven at a high velocity by means of the drive-belt 13. Grinding-emery is applied between the lens-forming surfaces 21 and 23 of the tools or mandrels 22 and 24, respectively, and the operator seizes the handle end of the lever 26 to apply the lens-forming end 21 of the primary lens-grinding tool or mandrel 22 to the surfaces of the glass 18 to be ground. The secondary lens-grinding tool or mandrel 24 is independently operated by means of the lever 29 and may be caused to form the minor lenses simultaneously with the formation of the major lens. The operator having thus ground the glass to form the major and minor lenses concentric or on a common center, the operator removes the said glass 18 thus operated upon, dresses the same down to the dotted lines shown in Fig. 5 to form the lens shown in Fig. 6 constituted of the major lens 19 and the minor lens 20, or what is termed a "bifocal" lens, and this completes the operation of forming the bifocal lens, which, although the line of demarcation between the lenses is clearly defined in the drawings, is practically invisible in a lens manufactured in this way.

Having thus fully described this my invention, what I claim as new and useful, and desire to cover by Letters Patent of the United States therefor, is—

1. In a lens-grinding apparatus, the combination with a revoluble table, a vertically-extending and vertically-adjustable non-revoluble lens-grinding tool or mandrel having an end grinding-surface curved to correspond with the configurations of the required lens, means for adjustably supporting said tool vertically over said revoluble table and means for moving said tool or mandrel nearer to or farther from said table.

2. In a lens-grinding apparatus, the combination with a revoluble table, a vertically-extending primary grinding-tool having a central bore the bottom end grinding-surface of said tool being curved between the bore and the exterior periphery thereof to correspond with the configuration of the lens to be formed, a secondary lens-grinding tool arranged to slide longitudinally in the bore of said primary tool, the bottom curvature of the grinding end surface of which is varied from that of the primary tool and means for operating the said primary and secondary tools independently of each other.

3. In a lens-grinding apparatus, the combination with a revoluble table for supporting the glass to be ground, a non-revoluble grinding-tool having its forming or grinding end curved to correspond with the conformation of the required lens confronting said revoluble table, and means whereby said tool may be moved nearer to or farther from said table and whereby said tool is adjustably supported vertically over said table.

4. In a lens-grinding apparatus, the combination with a revoluble table for supporting the glass to be ground, of a stationary grinding-tool, comprising a primary lens-grinding tool or mandrel provided with a central longitudinally-extending bore and a secondary lens-grinding tool or mandrel fitted within the bore of said primary mandrel and adapted to be moved longitudinally therein, and each of said primary and secondary mandrels having their grinding end surfaces independently curved, said primary and secondary mandrels situated to have their grinding end surfaces confronting said revoluble table and means for independently operating said primary and secondary mandrels to be moved nearer to or farther from said revoluble table.

5. In a lens-grinding apparatus, the combination with a fixed table, a vertically-extending revoluble shaft, supported by said table, having its upper end extending above the surface thereof, a revoluble table mounted on the upper projecting end of said revoluble shaft to turn therewith, of a vertically-extending grinding tool or mandrel having its end shaped to grind lenses of the required conformations confronting said revoluble table, a lever-support, a lever hinged at its end to said support to extend diametrically across and over said revoluble table, and having a bore situated intermediate the hinged and free ends of said lever, adapted to receive the vertical grinding tool or mandrel to be adjustably secured therein.

6. In a lens-grinding apparatus, the combination with a revoluble table for supporting the glass to be ground, of a stationary grinding tool or mandrel having its axis coinciding with the axis of said revoluble table, confronting said revoluble table, said grinding tool or mandrel having its end shaped to grind lenses of the required conformations, a lever-support, a lever hinged at its end to said support to extend diametrically across and over said revoluble table, and having a bore, situated intermediate the hinged and free ends of said lever, adapted to receive the vertical grinding tool or mandrel to be adjustably secured therein.

7. In a lens-grinding apparatus, the combination with a fixed table, a vertically-extending revoluble shaft, supported by said table, having its upper end extending above the surface thereof, a revoluble table mounted on the upper projecting end of said revoluble shaft to turn therewith, of a non-revoluble grinding tool or mandrel having its axis coinciding with the axis of said revoluble table, confronting said revoluble table, said grinding tool or mandrel having its end shaped to grind lenses of the required conformations, a hinged lever situated to extend diametrically across and over said revoluble table and means for adjustably securing said grinding tool or mandrel to said lever.

8. In a lens-grinding apparatus, the combination with a fixed table, a vertically-extending revoluble shaft supported, by said table, having its upper end extending above the surface thereof, a revoluble table mounted on the upper projecting end of said revoluble shaft to turn therewith, of a primary non-revoluble grinding tool or mandrel having a longitudinally-extending central bore, an independent secondary mandrel fitted in the bore of said primary mandrel to slide longitudinally therein, each of said grinding tools or mandrels having their end grinding-surfaces curved independently of each other to grind the lenses to the required conformations, said primary and secondary mandrels situated at right angles to the surface of said revoluble table with their longitudinal centers coinciding with the center thereof and their end surfaces confronting the same, a hinged primary lever situated to extend diametrically across and over said table, means for adjustably securing said primary grinding tool or mandrel to said lever, a secondary lever hinged to extend over the mandrel carried by said primary lever and connected intermediate its ends to the top end of said secondary mandrel, and means for supporting said secondary lever to maintain said secondary mandrel in position.

In testimony whereof I affix my signature in presence of two witnesses.

JOHN P. WIMMER.

Witnesses:
THOMPSON R. BELL,
FLORENCE GIMBEL.